US011600008B2

(12) United States Patent
Zhang et al.

(10) Patent No.: US 11,600,008 B2
(45) Date of Patent: Mar. 7, 2023

(54) HUMAN-TRACKING METHODS, SYSTEMS, AND STORAGE MEDIA

(71) Applicant: BAIDU ONLINE NETWORK TECHNOLOGY (BEIJING) CO., LTD., Beijing (CN)

(72) Inventors: Chengyue Zhang, Beijing (CN); Le Kang, Beijing (CN); Hongtian Yang, Beijing (CN); Song Yang, Beijing (CN); Tao Liu, Beijing (CN); Jingxi Lu, Beijing (CN); Yingze Bao, Beijing (CN); Mingyu Chen, Beijing (CN); Hongwu Zhang, Beijing (CN); Zeyu Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 112 days.

(21) Appl. No.: 16/818,861

(22) Filed: Mar. 13, 2020

(65) Prior Publication Data
US 2020/0294252 A1 Sep. 17, 2020

(30) Foreign Application Priority Data
Mar. 15, 2019 (CN) .......................... 201910199204.5

(51) Int. Cl.
*G06T 7/292* (2017.01)
*G06T 7/55* (2017.01)
(Continued)

(52) U.S. Cl.
CPC ................ *G06T 7/292* (2017.01); *G06T 7/30* (2017.01); *G06T 7/55* (2017.01); *G06T 5/002* (2013.01);
(Continued)

(58) Field of Classification Search
CPC .. G06T 7/292; G06T 7/55; G06T 7/30; G06T 2207/10024; G06T 2207/10028; G06T 2207/30196; G06T 5/002
See application file for complete search history.

(56) References Cited

U.S. PATENT DOCUMENTS 10,540,813 B1 * 1/2020 Uhlenbrock ......... G06K 9/6276
2014/0307952 A1 * 10/2014 Sweeney ................. G06T 7/593
382/154

(Continued)

FOREIGN PATENT DOCUMENTS

| CN | 102074019 A | 5/2011 |
| CN | 105957106 A | 9/2016 |

(Continued)

OTHER PUBLICATIONS

Kalarot et al., "3D object tracking with a high-resolution GPU based real-time stereo", Image and Vision Computing New Zealand (Year: 2012).*

(Continued)

*Primary Examiner* — Kenny A Cese
(74) *Attorney, Agent, or Firm* — Lathrop GPM LLP

(57) ABSTRACT

The disclosure provides human-tracking methods, systems, and storage media. The method includes: acquiring a plurality of human point clouds of a current frame from a plurality of cameras; generating a total point cloud of the current frame by integrating the plurality of human point clouds of the current frame; acquiring a plurality of human point clouds of a next frame from the plurality of cameras; acquiring a total point cloud of the next frame by integrating the plurality of human point clouds of the next frame; and performing human tracking based on the total point cloud of the current frame and the total point cloud of the next frame.

6 Claims, 5 Drawing Sheets

(51) Int. Cl.
*G06T 7/30* (2017.01)
*G06T 5/00* (2006.01)

(52) U.S. Cl.
CPC ............... *G06T 2207/10024* (2013.01); *G06T 2207/10028* (2013.01); *G06T 2207/30196* (2013.01)

(56) References Cited

U.S. PATENT DOCUMENTS

| | | | |
|---|---|---|---|
| 2014/0341464 | A1 | 11/2014 | Fan et al. |
| 2017/0249783 | A1* | 8/2017 | Mach Shepherd ...... G06T 17/20 |
| 2018/0268256 | A1* | 9/2018 | Di Febbo ................. G06T 7/001 |
| 2019/0026958 | A1* | 1/2019 | Gausebeck .......... H04N 13/246 |
| 2019/0042865 | A1* | 2/2019 | Vallespi-Gonzalez ....................... G06K 9/00986 |
| 2019/0231432 | A1* | 8/2019 | Amanatullah .......... G09B 23/28 |
| 2019/0271780 | A1* | 9/2019 | Bravo Orellana ...... G01S 17/87 |
| 2019/0355173 | A1* | 11/2019 | Gao .......................... G06T 17/05 |
| 2020/0125830 | A1* | 4/2020 | Lei ........................ G06K 9/4652 |
| 2020/0142067 | A1* | 5/2020 | Wang .................... G01S 17/931 |
| 2020/0175844 | A1* | 6/2020 | Bravo Orellana ........................... G08B 13/19691 |
| 2021/0012568 | A1* | 1/2021 | Michielin ............. G06T 3/0093 |
| 2021/0233263 | A1* | 7/2021 | Soper ........................ G06T 7/33 |
| 2021/0272359 | A1* | 9/2021 | Michielin ................. G06T 7/66 |

FOREIGN PATENT DOCUMENTS

| | | |
|---|---|---|
| CN | 106548520 A | 3/2017 |
| CN | 107341819 A | 11/2017 |
| CN | 108446585 A | 8/2018 |
| CN | 108664841 A | 10/2018 |
| CN | 108921874 A | 11/2018 |
| CN | 109087388 A | 12/2018 |
| CN | 109344812 A | 2/2019 |

OTHER PUBLICATIONS

Trinh et al., "Human extraction from a sequence of depth images using segmentation and foreground detection", Information and Communication Technology (Year: 2014).*
Amplianitis et al., "Calibration of a Multiple Stereo and RGB-D Camera System for 3D Human Tracking", The International Archives of the Photogrammetry, Remote Sensing and Spatial Information Sciences, vol. XL-3/W1, 2014 EuroCOW 2014, the European Calibration and Orientation Workshop, Feb. 2014 (Year: 2014).*
European Patent Application No. 20162428.5 extended Search and Opinion dated Jul. 21, 2020, 9 pages.
Chinese Patent Application No. 201910199204.5 First Office Action dated Oct. 14, 2020, 9 pages.
Chinese Patent Application No. 201910199204.5 English translation of First Office Action dated Oct. 14, 2020, 12 pages.
Trinh, L A, et al.; Human Extraction from a Sequence of Depth Images Using Segmentation and Foreground Detection; SoICT '14: Proceedings of the Fifth Symposium on Information and Communication Technology; Dec. 2014; pp. 178-185.
Kalarot, R., et al.; "3D Object Tracking with a High-Resolution GPU Based Real-Time Stereo" Conference on Image and Vision Computing New Zealand Nov. 26, 2012, pp. 394-399.

* cited by examiner

HUMAN-TRACKING METHODS, SYSTEMS, AND STORAGE MEDIA

CROSS-REFERENCE TO RELATED APPLICATION

This application claims priority to and benefit of Chinese Patent Application No. 201910199204.5, filed on Mar. 15, 2019, the entire content of which is incorporated herein by reference.

TECHNICAL FIELD

The disclosure relates to the field of technologies for computer vision, and more particularly, to a human-tracking method, a human-tracking system, and a computer-readable storage medium.

BACKGROUND

Human tracking is focused on relationships among persons, products and places in a smart retail scene through visual recognition technologies and multi-sensor fusion. In the related art, in order to understand persons in the scene, the most direct way is by realizing the recognition function through 2-dimensional (2D) detection and person re-identification (ReID), realizing the positioning function by multi-camera calibration and triangulation, and realizing the continuous tracking function in space and time through 2D tracking. The overall technology relies on a plurality of monocular cameras with 3-dimensional (3D) calibration.

SUMMARY

Embodiments of a first aspect of the disclosure provide a human-tracking method. The method includes: acquiring a plurality of human point clouds of a current frame from a plurality of cameras; generating a total point cloud of the current frame by integrating the plurality of human point clouds of the current frame; acquiring a plurality of human point clouds of a next frame from the plurality of cameras; acquiring a total point cloud of the next frame by integrating the plurality of human point clouds of the next frame; and performing human tracking based on the total point cloud of the current frame and the total point cloud of the next frame.

Embodiments of a second aspect of the disclosure provide a human-tracking system. The system includes a plurality of cameras and a server. The server is configured to receive a plurality of human point clouds of a current frame from the plurality of cameras, generate a total point cloud of the current frame by integrating the plurality of human point clouds of the current frame, receive a plurality of human point clouds of a next frame from the plurality of cameras, acquire a total point cloud of the next frame by integrating the plurality of human point clouds of the next frame, and perform human tracking based on the total point cloud of the current frame and the total point cloud of the next frame.

Embodiments of a third aspect of the disclosure provide a computer-readable storage medium having computer programs stored thereon. When the computer programs are executed by a processor, the method according to embodiments of the first aspect is implemented.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

The above and/or additional aspects and advantages of embodiments of the disclosure will become apparent and more readily appreciated from the following descriptions made with reference to the drawings, in which.

DETAILED DESCRIPTION

Figure 1:
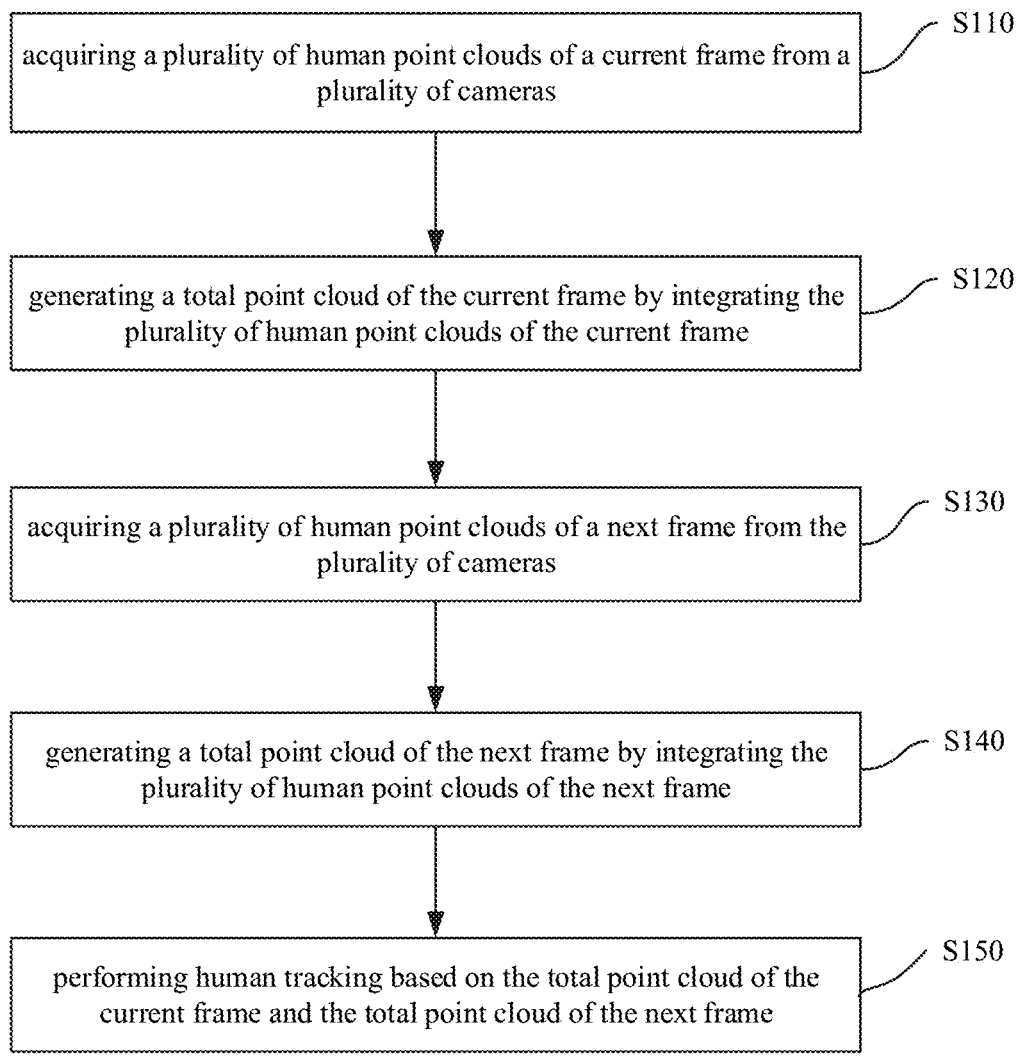
FIG. 1 is a flowchart of a human-tracking method according to an embodiment of the disclosure.

Embodiments of the disclosure will be described in detail in the following and examples of the embodiments are illustrated in the drawings. The same or similar elements and the elements having the same or similar functions are denoted by like reference numerals throughout the descriptions. The embodiments described herein with reference to the drawings are explanatory, serve to explain the disclosure, and are not construed to limit the disclosure.

It is focused on relationships among persons, products and places in a smart retail scene through visual recognition technologies and multi-sensor fusion. The human recognition, tracking and positioning are a crucial part of the entire solution. The human recognition may detect every customer entering the scene and remember their appearance features, meanwhile the stability of recognition may be ensured by simultaneously capturing the scene through a plurality of cameras. When the human recognition with the plurality of cameras exists, the customer's true 3D location may be estimated based on geometric relation, and the positioning may complete spatial constraints. The tracking may ensure the continuity of results of recognition and positioning in time and space. The combination of the three technologies may provide support for acquiring real-time locations of customers, and guarantee for subsequent understanding of customer behaviors, customer-to-product interaction, and customer interactions.

In addition, other than the above core functions, the accuracy, robustness, stability of the effects, and resource occupancy directly determine whether the solution may be successfully implemented.

In the related art, to understand persons in the scene, it is the most direct way to realize the recognition function by 2D detection and ReID, and realize the positioning function by multi-camera calibration and triangulation, and realize the continuous tracking function in space and time through 2D tracking. The overall technology relies on a plurality of monocular cameras with 3D calibration.

In detail, there are M customers in the scene at a certain moment T. k1 (a total of K cameras) cameras may observe customer m1, that is, an appearance of a certain customer may be detected from k1 images through 2D detection, without knowing which customer it is. Suppose that M customers are observed for N times by the K cameras, the across-camera ReID technology is responsible for recognizing and classifying N observations into M known categories, such that the correspondence of the same customer under a plurality of cameras may be acquired. Next, the camera parameters that have been calibrated and the location information of the same customer under different cameras may be utilized to calculate the 3D location of the customer in the actual scene by triangulation, and the estimation of the customer location at that moment is completed.

All operations at the moment T may be repeated for a moment T+1. However, this may acquire the customer locations at the moment T and at the moment T+1 only, which lacks temporal correlation. At this time, the range of the ReID may be extended to the time domain, that is, the matching of a certain customer and historical customer information is also considered at the moment T+1. However, the more natural way is to utilize the 2D tracking technology to directly match the results of the two moments. The across-time ReID and tracking technology opens up results of continuous frames in the video and completes the final step of the human solution.

However, the inventors have found through research that it is difficult to ensure the stability of the above solution on the time domain, and the cumulative error of the system gradually become larger. In detail, when people are gathering, it is difficult to achieve perfect results by 2D tracking, and it is easy to fail in occlusion and crisscrossing, and it is fatal that failure is often difficult to capture since there is no significant difference between failure and normal circumstances to the system. The cross-time ReID technology involves the establishment of an ID library. The effect is ideal under a condition of an accurate library with a sufficient number of samples. But the actual situation is that it is a gradual process when the customers entering the scene. The effect of ReID decreases obviously when the number of samples in the ID library is small in the early stage. It is more tragic that as time goes by, small errors in the previous period are gradually enlarged to completely affect the final effect. In conclusion, the 2D monocular solution lacks a stable correlation technology on the time domain, and this technology should be very robust to common situations such as occlusion and crisscrossing.

In addition to the effect problem, the detection and ReID technologies of the above 2D monocular solution are very resource-consuming. Because of the instability of tracking technology, a vicious circle caused by the ReID usage may be intensified, which is also a disadvantage of resource utilization.

In order to solve the above problem, the disclosure proposes a new and robust human-tracking method. In order to avoid the instability of the 2D tracking results, the disclosure adopts point clouds in the scene and acquired by binocular cameras, and tracking the 2D results may be replaced by tracking the point clouds. In this way, under the layout of dense cameras in the retail scene, the quality of the point clouds may be well ensured, so the overall tracking effect is greatly improved. In detail, a human-tracking method, a human-tracking apparatus, a human-tracking system, an electronic device, and a computer-readable storage medium according to the embodiments of the disclosure are described below with reference to the drawings.

FIG. 1 is a flowchart of a human-tracking method according to an embodiment of the disclosure. As illustrated in FIG. 1, the method includes the following.

At block S110, a plurality of human point clouds of a current frame are acquired from a plurality of cameras.

For example, the human-tracking method according to the embodiments of the disclosure may be applied for a smart retail scene in which the plurality of cameras may be arranged. Each camera may capture the current scene to collect depth images and RGB color images. Each camera may acquire the corresponding depth image and RGB color image meanwhile combine the depth image and RGB color image acquired to generate the corresponding human point cloud. That is, each human point cloud is generated by the corresponding camera based on the depth image and color image currently acquired by the corresponding camera.

For example, each camera may generate its human point clouds in the following ways: acquiring the depth image and color image currently acquired; removing a background from the depth image; performing coordinate transformation on the depth image without the background using internal parameters of the corresponding camera to acquire a corresponding point cloud; and recognizing human locations on the point cloud corresponding to the depth image based on the color image to acquire the human point cloud.

That is, each camera is capable of acquiring the depth image and the RGB color image of the current scene, removing the background from the depth image by using a background difference mode, performing coordinate transformation on the depth image after removing the background using the internal parameters of the camera to acquire the corresponding point cloud, and marking points of the depth image based on the corresponding between points in the color image and points in the point cloud to recognize the human locations, thereby acquiring the human point cloud of the camera.

In an embodiment of the disclosure, the camera may be a binocular camera. The depth image may be acquired by the binocular camera based on the calculation on two color images. For example, the binocular camera may capture the current scene in a preset capturing mode to acquire two color images, and calculate the two color images to acquire the depth image. In detail, the binocular camera may be calibrated to acquire the internal and external parameters of the binocular camera and a homography matrix, and the original image acquired is corrected based on the calibration result. The corrected two images are located on the same plane and parallel to each other. Pixel point matching are performed on the two corrected color images, and the depth of each pixel is calculated based on the matching result, thereby acquiring the depth image.

At block S120, a total point cloud of the current frame is generated by integrating the plurality of human point clouds of the current frame.

In detail, external parameters of the plurality of cameras are determined, and coordinate transformation is performed on the plurality of human point clouds based on the external parameters of the plurality of cameras to integrate the plurality of human point clouds into the same coordinate system, such that the total point cloud is acquired correspondingly.

That is, when the plurality of human point clouds generated by the plurality of cameras are acquired, coordinate transformation is performed on the plurality of human point clouds generated by the plurality of cameras by using the external parameters of the plurality of cameras to integrate the plurality of human point clouds into the same coordinate system and generate the total point cloud correspondingly.

At block S130, a plurality of human point clouds of a next frame are acquired from the plurality of cameras. The detail at block S130 may be referred to the detail disclosed at block S110.

At block S140, a total point cloud of the next frame is acquired by integrating the plurality of human point clouds of the next frame. The detail at block S140 may be referred to the detail disclosed at block S120.

The total point cloud of the next frame is acquired in the same manner as the total point cloud of the current frame. In detail, the plurality of human point clouds from the plurality of cameras may be acquired. Each human point cloud is generated by a corresponding camera based on a depth image and color image of the next frame acquired by the corresponding camera. Coordinate transformation is performed on the plurality of human point clouds generated by the plurality of cameras by using the external parameters of the cameras to integrate the human plurality of point clouds into the same coordinate system, and the total point cloud of the next frame is acquired correspondingly.

At block S150, human tracking is performed based on the total point cloud of the current frame and the total point cloud of the next frame.

In detail, points in the total point cloud of the current frame are clustered to acquire 3D location information of the current frame, and points in the total point cloud of the next frame are clustered to acquire 3D location information of the next frame, and the human tracking is performed based on the 3D location information of the current frame and the 3D location information of the next frame.

For example, the clustering algorithm may be utilized to cluster the points in the total point cloud of the current frame to acquire the 3D location information of the current frame, and to cluster the points in the total point cloud of the next frame to acquire the 3D location information of the next frame, and the human tracking effect may be achieved by combining the 3D location information of the upper and lower frames. In the embodiment of the disclosure, the clustering algorithm may include, but be not limited to, a K-Means clustering algorithm.

To improve the accuracy of the clustering result and further improve the tracking accuracy, in an embodiment of the disclosure, before clustering the points in the total point cloud, coordinates of the points in the total point cloud may be converted into discrete values, with a preset length as a basic unit, in which a value in each unit is a number of points in a vertical direction; and the points in the total point cloud are de-noised based on the discrete values.

That is, before clustering the points in the total point cloud, the preset length is taken as the basic unit to convert the coordinates of the points in the total point cloud into the discrete values. For example, the value in each unit (i.e., the discrete value) is the number of points in the vertical direction, that is, the number of points in the vertical direction of each unit is taken as the unit value, and the unit value represents all the points in the unit, so that the coordinates of the points in the total point cloud may be converted into the discrete values, and then the discrete values may be compared with the preset threshold. The point in the unit with the discrete value smaller than the preset threshold is removed, that is, the area containing less points in the unit is removed, thereby achieving the purpose of de-noising.

It may be understood that before the points in the total point cloud is clustered, the points in the total point cloud needs to be de-noised, so that a relatively-clean human point cloud may be acquired.

It should be noted that the human-tracking method according to the embodiments of the disclosure may be applied for the human-tracking apparatus according to the embodiment of the disclosure. The human-tracking apparatus is configured in an electronic device. For example, the electronic device may be a server. In the embodiment of the disclosure, the calculation of the depth image and the human point cloud of the corresponding camera are distributed to the corresponding camera. Subsequent processes are accelerated by the CPU of the server. That is, the calculation of human tracking based on the plurality of human point clouds of the plurality of cameras is allocated to the server, i.e., the computing resources of the server are reduced by distribution technology, and at least half of the total computing resources of the server may be optimized and refined by the acceleration processing using the CPU of the server. In addition, the disclosure is the human tracking technology based on the point clouds, which may provide a stability effect far superior to 2D tracking, thereby significantly reducing the dependence on detection and ReID, and greatly improving the stability of the overall system.

With the human-tracking method according to the embodiments of the disclosure, the total point cloud of the current frame is generated by integrating the plurality of human point clouds of the current frame, and the total point cloud of the next frame is generated by integrating the plurality of human point clouds of the next frame; and the human tracking may be performed based on the total point cloud of the current frame and the total point cloud of the next frame. In other words, the human tracking may be realized based on the plurality of human point clouds of the plurality of cameras, which may replace the traditional 2D tracking solution, and provide a stability effect far superior to that of the traditional 2D tracking, thereby significantly reducing the dependence on the detection and ReID, greatly improving the stability of the whole system, and improving the overall tracking effect.

Figure 2:
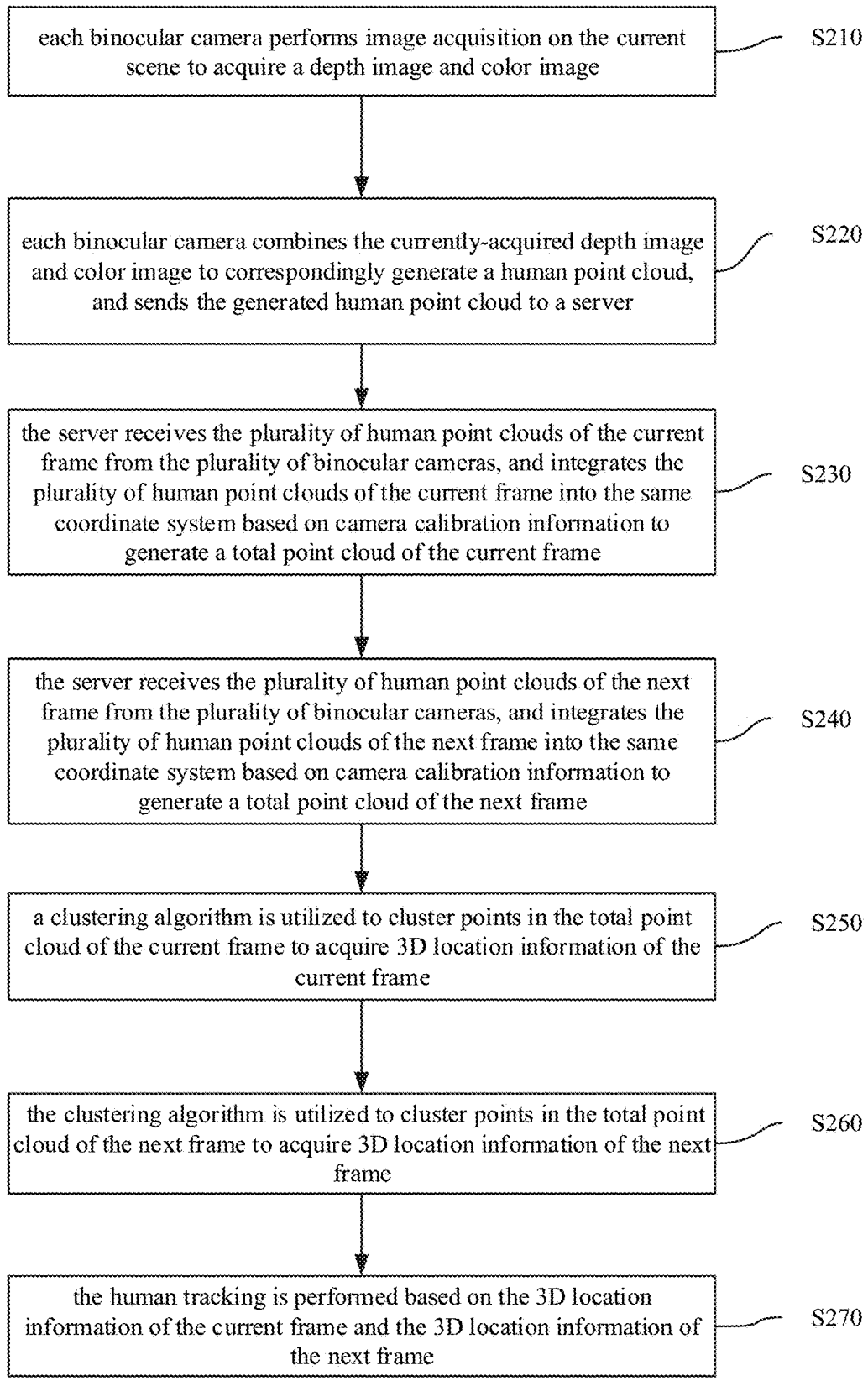
FIG. 2 is a flowchart of a human-tracking method according to an embodiment of the disclosure.
Figure 3:
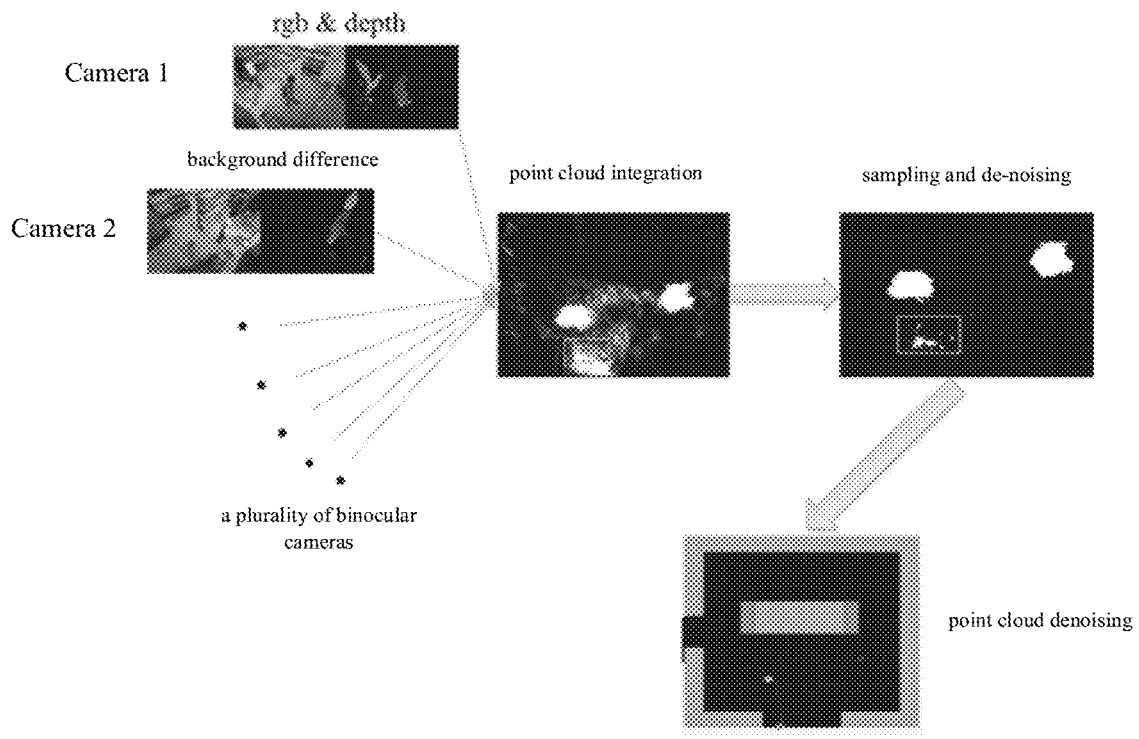
FIG. 3 is a schematic diagram of an overall framework of point cloud tracking according to an embodiment of the disclosure.

FIG. 2 is a flowchart of a human-tracking method according to an embodiment of the disclosure. FIG. 3 is a schematic diagram of an overall framework of point cloud tracking according to an embodiment of the disclosure. It should be noted that the human-tracking method according to the embodiment of the disclosure may be applied in the smart retail scene.

As illustrated in FIGS. 2 and 3, the method includes the following.

At block S210, a plurality of binocular cameras are arranged in the smart retail scene. Each binocular camera performs image acquisition on the current scene to acquire a depth image and color image.

For example, each binocular camera may capture the current scene in a preset capturing mode to acquire two color images, and calculate the two color images to acquire the depth image.

At block S220, each binocular camera combines the currently-acquired depth image and color image to correspondingly generate a human point cloud, and sends the generated human point cloud to a server.

For example, each camera is capable of acquiring the depth image and the RGB color image on the current scene, performing background removal on the depth image by using a background difference mode, performing coordinate transformation on the depth image after background removal using internal parameters of the camera to acquire the corresponding point cloud, and marking the points of the depth image by the corresponding relation between points in the color image and points in the point cloud to realize the human location recognition, thereby acquiring the human point cloud of the camera.

At block S230, the server receives the plurality of human point clouds of the current frame from the plurality of binocular cameras, and integrates the plurality of human point clouds of the current frame into the same coordinate system based on camera calibration information to generate a total point cloud of the current frame.

At block S240, the server receives the plurality of human point clouds of the next frame from the plurality of binocular cameras, and integrates the plurality of human point clouds of the next frame into the same coordinate system based on camera calibration information to generate a total point cloud of the next frame.

For example, the preset length is taken as the basic unit, and the coordinates of the points in the total point cloud may be converted into discrete values. The value in each unit (i.e., the discrete value) is the number of points in the vertical direction. The points in the total point cloud may be de-noised to remove points with a value that is too small, to achieve the de-noising process.

At block S250, a clustering algorithm is utilized to cluster points in the total point cloud of the current frame to acquire 3D location information of the current frame.

At block S260, the clustering algorithm is utilized to cluster points in the total point cloud of the next frame to acquire 3D location information of the next frame.

At block S270, the human tracking is performed based on the 3D location information of the current frame and the 3D location information of the next frame. In other words, the 3D location information of the current frame and the 3D location information of the next frame are combined to achieve the tracking effect.

In conclusion, the inventors have found through research that the disclosure is the human tracking technology based on the point clouds, which may provide a stability effect far superior to 2D tracking, thereby significantly reducing the dependence on detection and ReID, and greatly improving the stability of the overall system. Meanwhile, portion of the calculation required by the disclosure may be allocated to each terminals, and the total calculation resources have been optimized and simplified by at least half.

Figure 4:
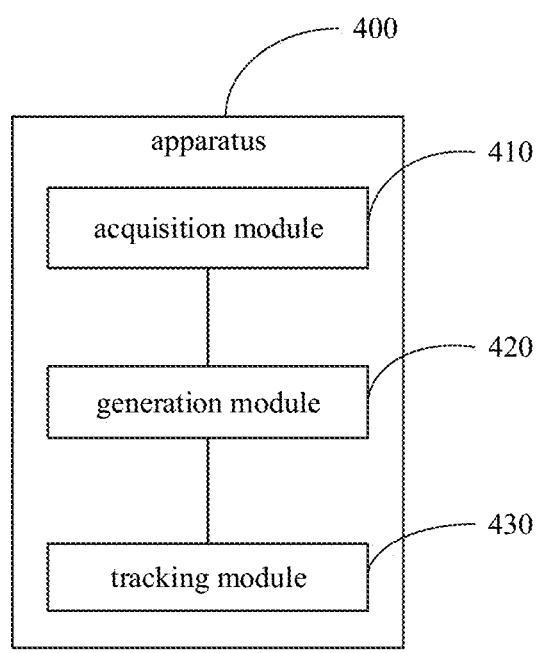
FIG. 4 is a block diagram of a human-tracking apparatus according to an embodiment of the disclosure.

Corresponding to the human-tracking method provided in the above embodiments, an embodiment of the disclosure further provides a human-tracking apparatus, which corresponds to the human-tracking method according to the embodiments of the disclosure. Therefore, the human-tracking method described above is also applicable for the human-tracking apparatus in this embodiment, which is not described in detail in this embodiment. FIG. 4 is a block diagram of a human-tracking apparatus according to an embodiment of the disclosure. As illustrated in FIG. 4, the apparatus 400 may include: an acquisition module 410, a generation module 420, and a tracking module 430.

In detail, the acquisition module 410 is configured to acquire a plurality of human point clouds of a current frame from a plurality of cameras. The generation module 420 is configured to generate a total point cloud of the current frame by integrating the plurality of human point clouds of the current frame. The acquisition module 410 is further configured to acquire a plurality of human point clouds of a next frame from the plurality of cameras. The generation module 420 is configured to generate a total point cloud of the next frame by integrating the plurality of human point clouds of the next frame. The tracking module 430 is configured to perform human tracking based on the total point cloud of the current frame and the total point cloud of the next frame.

For example, the human point cloud is generated by: acquiring a depth image and color image currently acquired; removing a background from the depth image; performing coordinate transformation on the depth image without the background using internal parameters of the corresponding camera to acquire a corresponding point cloud; and recognizing human locations on the point cloud corresponding to the depth image based on the color image to acquire the human point cloud.

In an embodiment of the disclosure, the camera may be a binocular camera.

For example, the generation module 420 is configured to: determine external parameters of the plurality of cameras; and perform coordinate transformation on the plurality of human point clouds to integrate the plurality of human point clouds into the same coordinate system based on the external parameters of the plurality of cameras, to acquire the total point cloud.

For example, the human tracking module 430 is configured to: cluster points in the total point cloud of the current frame to acquire 3-dimensional location information of the current frame; cluster points in the total point cloud of the next frame to acquire 3-dimensional location information of the next frame; and perform human tracking based on the 3-dimensional location information of the current frame and the 3-dimensional location information of the next frame.

Figure 5:
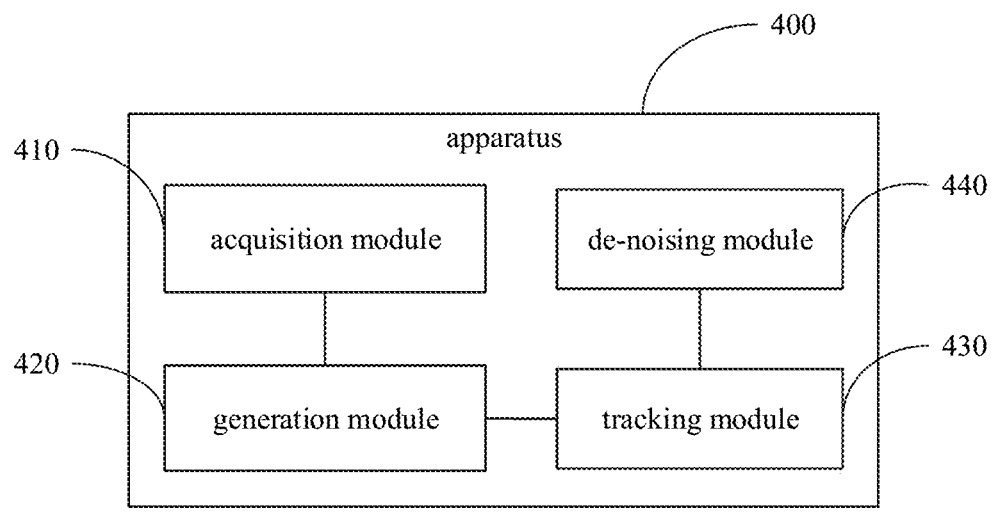
FIG. 5 is a block diagram of a human-tracking apparatus according to an embodiment of the disclosure.

In an embodiment of the disclosure, as illustrated in FIG. 5, the apparatus 400 may include: a de-noising module 440. The de-noising module 440 is configured to sample and de-noise on the total point cloud. In detail, the de-noising module 440 is configured to convert, with a preset length as a basic unit, coordinates of the points in the total point cloud into discrete values, wherein a value in each unit is a number of points in a vertical direction; and de-noise the points in the total point cloud based on the discrete values.

In order to realize the above embodiments, the disclosure also provides a human-tracking system.

Figure 6:
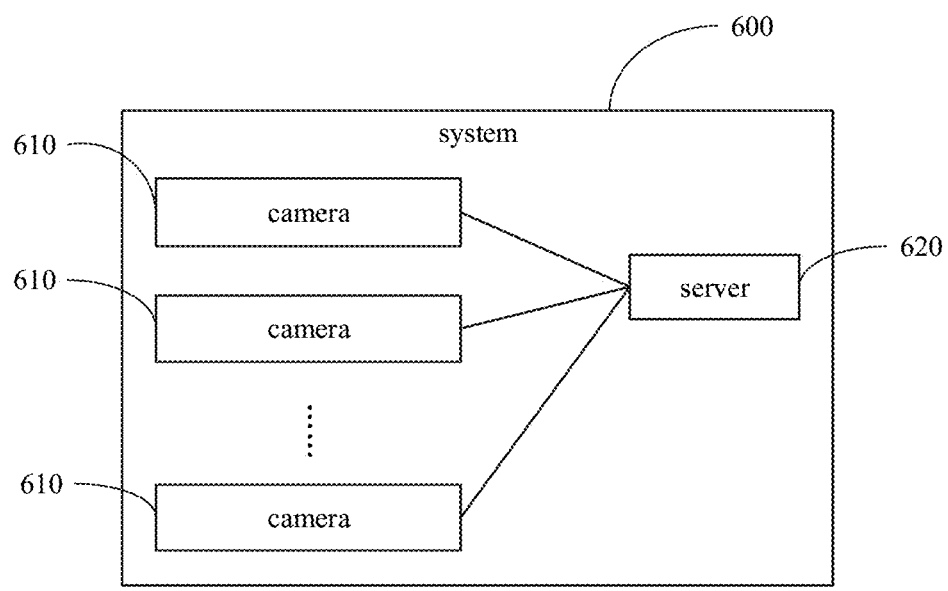
FIG. 6 is a block diagram of a human-tracking system according to an embodiment of the disclosure.
Figure 7:
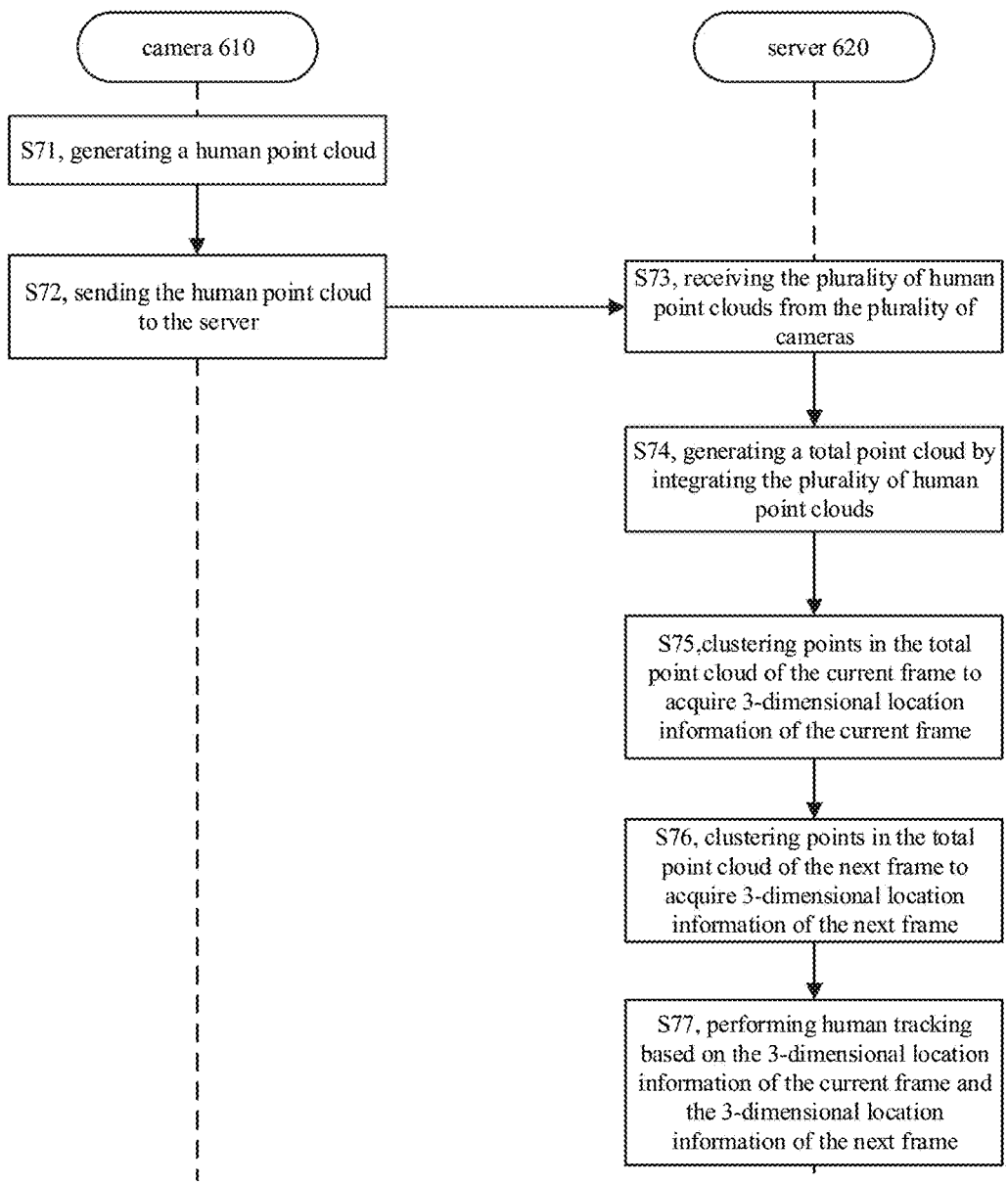
FIG. 7 is an interaction flowchart of a human-tracking system according to an embodiment of the disclosure.

FIG. 6 is a block diagram of a human-tracking system according to an embodiment of the disclosure. FIG. 7 is an interaction flowchart of a human-tracking system according to an embodiment of the disclosure. As illustrated in FIGS. 6 and 7, the system 600 include a plurality of cameras 610 and a server 620. In an embodiment of the disclosure, the camera may be a binocular camera.

In detail, each camera 610 is configured to generate (S71) a human point cloud based on a depth image and color image currently acquired and send (S72) the human point cloud to the server 620.

For example, the camera 610 may generate the human point cloud in the following ways: acquiring the depth image and color image currently acquired; removing a background from the depth image; performing coordinate transformation on the depth image without the background using internal parameters of the corresponding camera to acquire a corresponding point cloud; and recognize human locations on the point cloud corresponding to the depth image based on the color image to acquire the human point cloud.

The server 620 is configured to receive (S73) the plurality of human point clouds of a current frame from the plurality of cameras 610, and generate (S74) a total point cloud of the current frame by integrating the plurality of human point clouds of the current frame based on camera calibration information of the cameras 610, receive the plurality of human point clouds of a next frame from the plurality of cameras 610, and generate a total point cloud of the next frame by integrating the plurality of human point clouds of the next frame based on camera calibration information of the cameras 610, and perform human tracking based on the total point cloud of the current frame and the total point cloud of the next frame. The receiving the plurality of human point clouds of the next frame is same as the act at S73, and the generating the total point cloud of the next frame is same as the act at S74.

In an embodiment of the disclosure, the server 620 is configured to generate the total point cloud by: determining external parameters of the cameras; and performing coordinate transformation on the plurality of human point clouds to integrate the plurality of human point clouds into the same coordinate system based on the external parameters of the cameras, to acquire the total point cloud.

In an embodiment of the disclosure, the server 620 is configured to perform human tracking based on the total point cloud of the current frame and the total point cloud of the next frame by: clustering (S75) points in the total point cloud of the current frame to acquire 3-dimensional location information of the current frame, clustering (S76) points in the total point cloud of the next frame to acquire 3-dimensional location information of the next frame, and performing (S77) human tracking based on the 3-dimensional location information of the current frame and the 3-dimensional location information of the next frame.

In an embodiment of the disclosure, the server 620 is configured to, sample and de-noise on the total point cloud. In detail, the server 620 is configured to convert, with a preset length as a basic unit, coordinates of the points in the total point cloud into discrete values, in which a value in each unit is a number of points in a vertical direction; and de-noise the points in the total point cloud based on the discrete values.

In order to realize the above embodiments, the disclosure also provides an electronic device.

Figure 8:
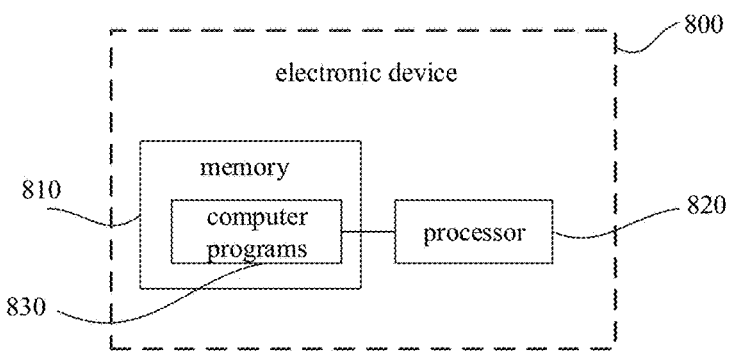
FIG. 8 is a block diagram of an electronic device according to an embodiment of the disclosure.

FIG. 8 is a block diagram of an electronic device according to an embodiment of the disclosure. As illustrated in FIG. 8, the electronic device 800 includes a memory 810, a processor 820, and computer programs 830 stored on the memory 810 and operable on the processor 820. When the computer programs 830 are executed by the processor 820, the method according to any one of the above embodiments is implemented.

In order to realize the above embodiments, the disclosure provides a computer-readable storage medium having computer programs stored thereon. When the computer programs are executed by a processor, the method according to any one of the above embodiments is implemented.

In the description of the disclosure, it is to be understood that the meaning of "a plurality" is at least two, such as two, three, unless specifically defined otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Any process or method described in a flow chart or described herein in other ways may be understood to include one or more modules, segments or portions of codes of executable instructions for achieving specific logical functions or steps in the process, and the scope of a preferred embodiment of the disclosure includes other implementations, which should be understood by those skilled in the art.

The logic and/or step described in other manners herein or shown in the flow chart, for example, a particular sequence table of executable instructions for realizing the logical function, may be specifically achieved in any computer-readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer-readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following technologies known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer-readable storage medium. When the program is executed, one or a combination of the steps of the method in the above-described embodiments may be completed.

In addition, individual functional units in the embodiments of the disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer-readable storage medium.

The storage medium mentioned above may be read-only memories, magnetic disks or CD, etc. Although explanatory embodiments have been shown and described, it would be appreciated by those skilled in the art that the above embodiments cannot be construed to limit the disclosure, and changes, alternatives, and modifications can be made in the embodiments without departing from scope of the disclosure.

What is claimed is:

1. A human-tracking method, implemented in a smart retail scene comprising a server and a plurality of cameras, and the method comprising:
  acquiring, by the server, a plurality of human point clouds of a current frame from the plurality of cameras, each of the plurality of cameras being a binocular camera;
  generating, by the server, a total point cloud of the current frame by integrating the plurality of human point clouds of the current frame;
  acquiring, by the server, a plurality of human point clouds of a next frame from the plurality of cameras;
  generating, by the server, a total point cloud of the next frame by integrating the plurality of human point clouds of the next frame; and
  performing, by the server, human tracking based on the total point cloud of the current frame and the total point cloud of the next frame,
  wherein generating the total point cloud of the current frame or of the next frame, comprises:
  determining external parameters of the plurality of cameras; and
  performing coordinate transformation on the plurality of human point clouds of the current frame or of the next frame to a plurality of new human point clouds of the current frame or of the next frame; and
  integrating the plurality of new human point clouds of the current frame or of the next frame into a same coordinate system based on the external parameters of the plurality of cameras, to acquire the total point cloud of the current frame or of the next frame,
  wherein performing human tracking based on the total point cloud of the current frame and the total point cloud of the next frame, comprises:
  clustering points in the total point cloud of the current frame to acquire 3-dimensional location information of the current frame;
  clustering points in the total point cloud of the next frame to acquire 3-dimensional location information of the next frame; and
  performing human tracking based on the 3-dimensional location information of the current frame and the 3-dimensional location information of the next frame,
  wherein the method further comprises:
  sampling and de-noising on the total point cloud;
  wherein sampling and de-noising the total point cloud comprises:
  converting, with a preset length as a basic unit, coordinates of the points in the total point cloud into discrete values, wherein a value in each unit is a number of points in a vertical direction; and
  de-noising the points in the total point cloud based on the discrete values.

2. The method of claim 1, wherein the human point cloud is generated by:
  acquiring a depth image and color image currently acquired;
  removing a background from the depth image;
  performing coordinate transformation on the depth image without the background using internal parameters of the corresponding camera to acquire a corresponding point cloud; and
  recognizing human locations on the point cloud corresponding to the depth image based on the color image to acquire the human point cloud.

3. A human-tracking system, implemented in a server, the server being implemented in a smart retail scene comprising a plurality of cameras, and the apparatus comprising:
  the plurality of cameras, each of the plurality of cameras being a binocular camera; and
  the server, configured to receive a plurality of human point clouds of a current frame from the plurality of cameras, generate a total point cloud of the current frame by integrating the plurality of human point clouds of the current frame, receive a plurality of human point clouds of a next frame from the plurality of cameras, acquire a total point cloud of the next frame by integrating the plurality of human point clouds of the next frame, and perform human tracking based on the total point cloud of the current frame and the total point cloud of the next frame,
  wherein the server is configured to:
  determine external parameters of the plurality of cameras; and
  perform coordinate transformation on the plurality of human point clouds of the current frame or of the next frame to a plurality of new human point clouds of the current frame or of the next frame; and
  integrate the plurality of new human point clouds of the current frame or of the next frame into a same coordinate system based on the external parameters of the plurality of cameras, to acquire the total point cloud of the current frame or of the next frame,
  wherein the server is configured to:
  cluster points in the total point cloud of the current frame to acquire 3-dimensional location information of the current frame;
  cluster points in the total point cloud of the next frame to acquire 3-dimensional location information of the next frame; and
  perform human tracking based on the 3-dimensional location information of the current frame and the 3-dimensional location information of the next frame,
  wherein the server is configured to:
  sample and de-noise on the total point cloud,
  wherein the server is configured to sample and de-noise on the total point cloud by:
  converting, with a preset length as a basic unit, coordinates of the points in the total point cloud of into discrete values, wherein a value in each unit is a number of points in a vertical direction; and
  de-noising the points in the total point cloud based on the discrete values.

4. The system of claim 3, wherein the camera is configured to:
  acquire a depth image and color image currently acquired;
  remove a background from the depth image;
  perform coordinate transformation on the depth image without the background using internal parameters of the camera to acquire a corresponding point cloud; and recognize human locations on the point cloud corresponding to the depth image based on the color image to acquire the human point cloud.

5. A non-transient computer-readable storage medium having computer programs stored thereon, wherein when the computer programs are executed by a processor, a method is implemented in a smart retail scene comprising a server and a plurality of cameras, and the method, and the method comprises:

acquiring a plurality of human point clouds of a current frame from the plurality of cameras, each of the plurality of cameras being a binocular camera;

generating a total point cloud of the current frame by integrating the plurality of human point clouds of the current frame;

acquiring a plurality of human point clouds of a next frame from the plurality of cameras;

acquiring a total point cloud of the next frame by integrating the plurality of human point clouds of the next frame; and performing human tracking based on the total point cloud of the current frame and the total point cloud of the next frame, wherein generating the total point cloud of the current frame or of the next frame, comprises:

determining external parameters of the plurality of cameras; and performing coordinate transformation on the plurality of human point clouds of the current frame or of the next frame to a plurality of new human point clouds of the current frame or of the next frame; and integrating the plurality of new human point clouds of the current frame or of the next frame into a same coordinate system based on the external parameters of the plurality of cameras, to acquire the total point cloud of the current frame or of the next frame, wherein performing human tracking based on the total point cloud of the current frame and the total point cloud of the next frame, comprises:

clustering points in the total point cloud of the current frame to acquire 3-dimensional location information of the current frame;

clustering points in the total point cloud of the next frame to acquire 3-dimensional location information of the next frame; and performing human tracking based on the 3-dimensional location information of the current frame and the 3-dimensional location information of the next frame, wherein the method further comprises:

sampling and de-noising on the total point cloud, wherein sampling and de-noising the total point cloud comprises:

converting, with a preset length as a basic unit, coordinates of the points in the total point cloud into discrete values, wherein a value in each unit is a number of points in a vertical direction; and de-noising the points in the total point cloud based on the discrete values.

6. The non-transient computer-readable storage medium of claim 5, wherein the human point cloud is generated by:

acquiring a depth image and color image currently acquired;

removing a background from the depth image;

performing coordinate transformation on the depth image without the background using internal parameters of the corresponding camera to acquire a corresponding point cloud; and recognizing human locations on the point cloud corresponding to the depth image based on the color image to acquire the human point cloud.

* * * * *